Dec. 21, 1965     W. STELZER     3,224,516
LETTER WEIGHING SCALE
Filed Jan. 14, 1965
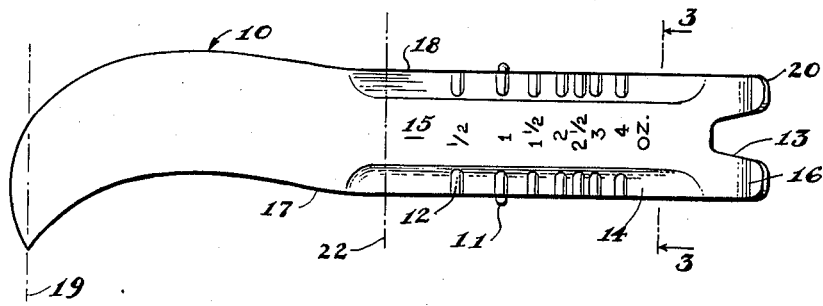
FIG. 1
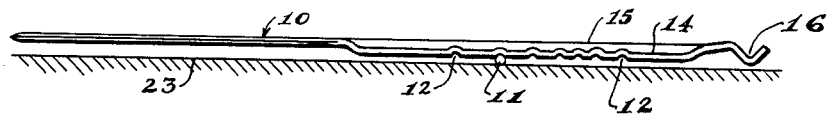
FIG. 2
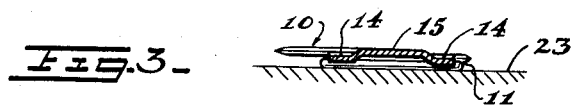
FIG. 3
FIG. 4
INVENTOR.
William Stelzer 3,224,516
LETTER WEIGHING SCALE
William Stelzer, 4351 Franklin Road,
Bloomfield Hills, Mich.
Filed Jan. 14, 1965, Ser. No. 425,591
4 Claims. (Cl. 177—172)

The invention relates to a letter weighing scale comprising a beam fulcrumed on a flat level surface such as that of a piece of furniture or other object that is not a part of the weighing scale. The novel weighing scale is related to the construction shown in my Patent No. 2,890,036.

The object of the invention is to produce an inexpensive yet accurate letter weigher that can be mass produced in an economical manner.

Another object is to provide a notch at one end of the scale adapted to carry a letter or similar object edgewise, and a plurality of fulcra intermediate the notch and the center of gravity of the scale consisting of transverse grooves, each shaped to receive a cylindrical pin by means of which the scale can rock on a flat surface of any suitable object serving as the support for the scale.

A further object is to make the pin magnetic and the body of the scale of ferrous material so that the pin is held in the groove in which it is placed without special retaining means and can be easily moved to another groove if desired.

Other objects and advantages of this invention will be apparent from the following detailed description considered in connection with the accompanying drawing submitted for the purpose of illustration and not to define the scope of the invention, reference being had for that purpose to the subjoined claims. In the drawing, wherein similar reference characters refer to similar parts throughout the several views:

FIG. 1 is a plan view of the improved scale;
FIG. 2, a side elevation thereof;
FIG. 3, a section taken on line 3—3 of FIG. 1; and
FIG. 4, a detail view of the magnetic pin.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

Referring now to FIGS. 1-4 of the drawing, the scale comprises a relatively wide beam 10 of minimum height and a cylindrical magnetized fulcrum pin 11 fitting into any one of a plurality of transverse notches 12 in the lateral flanges or side portions 14 of the beam. These side portions are depressed out of the plane of the beam so that the central portion 15 of the beam does not have any grooves and is therefore suited to receive indicia in the form of numerals or letters indicating certain weights, as shown.

One end of the beam is lightened as at 13 and provided with a V-groove or notch 16 into which the edge of a letter or similar article may be inserted for weighing. The other end of the beam has the shape of a curved dagger whose edges are thinned so that the scale can be used as a letter opener. The reason for the dagger shape is to obtain the cheapest construction where the beam can be stamped from sheet metal with a single cutting edge which allows the least amount of scrap. For this purpose the edges 17 and 18 are parallel so that the width of the beam between notch 16 and line 19 is constant at all points. This is an important feature of the invention. Due to the tolerances in stock thickness of the sheet metal from which the beam is stamped, it is desirable to vary the width of the beam according to the thickness of the material at hand in order to obtain the correct weight of the beam as otherwise the scale would not be accurate. This can easily be done, with the construction shown, with standard equipment where the stock feed can be adjusted to give the proper advance with each stroke of the press. Notch 13 and the rounded portions 20 are cut in a preceding step as in a progressive die.

The center of gravity of the beam is indicated by line 22. In order for the scale to be in balance, the distance between fulcrum pin 11 and notch 16 times the load must equal the distance between fulcrum 11 and line 22 times the weight of the beam. The weight of pin 11 has no effect on the balance.

In operation, the scale is placed on a flat surface 23 as shown in FIG. 2, and the letter to be weighed is supported edgewise in groove 16 in a vertical position, whereby the upper end is loosely held between two fingers to balance the letter on its edge. If the letter is too heavy and therefore tilts the scale, pin 11 may be moved into a groove indicating a heavier weight, for instance from the one ounce notch as shown to the 1½ ounce notch. It is not important to find the exact weight, but merely to know that a certain weight is not exceeded, in order to determine what the correct postage should be.

Having thus described my invention, I claim:

1. A letter weighing scale having a relatively wide ferrous beam of a predetermined weight, load supporting means at one end on the upper side of said beam adapted to support a load to be weighed, a plurality of transverse grooves in the underside of said beam intermediae said load supporting means and the center of gravity of said beam, and a magnetic pin adapted to be inserted in any of said transverse grooves to serve as a fulcrum for said scale to fulcrum on any flat level surface not a part of said scale, said magnetic pin being magnetically held by said beam in a groove into which it has been placed.

2. A letter weighing scale having a relatively wide ferrous beam of a minimum height and of a predetermined weight, said beam having the outline of a curved dagger of constant width throughout the major portion of its length so that in the manufacture of the scale said beam can be sheared from sheet metal with a single cutting edge where the advancement of the sheet metal relative to the cutting edge equals the width of said beam, load supporting means at one end of said beam considered the handle portion, the opposite curved end portion terminating in a point and being adapted to serve as a letter opener, a plurality of transverse grooves in the underside of said beam intermediate said load supporting means and the center of gravity of said beam, and a magnetic pin adapted to be inserted into any of said transverse grooves to serve as a fulcrum for said scale to fulcrum on any flat level surface, said magnetic pin being magnetically held by said beam in a groove into which it has been placed.

3. A letter weighing scale having a relatively wide beam stamped from ferrous sheet metal, one end of said beam being formed to provide a load supporting groove adapted to receive the edge of a letter or similar article to be weighed, a plurality of transverse grooves in the underside of said beam intermediate said load supporting groove and the center of gravity of said beam, and a magnetized pin adapted to be held by magnetic force when placed into one of said grooves in the underside of said beam to serve as a fulcrum on which said beam may rock.

4. A letter weighing scale having a relatively wide beam shaped like a curved dagger stamped from ferrous sheet metal, one end of said beam being considered the handle portion and being shaped to provide a V-shaped notch adapted to receive the edge of a letter or similar article to be weighed, the longitudinal edges of said beam being parallel throughout the major portion of the length of said beam, areas near both edges of said beam intermediate said V-shaped notch and the center of gravity of said beam being depressed out of the plane of said beam, transverse grooves in the underside of said areas, and a mangetized pin adapted to be inserted selectively into said grooves to serve as a fulcrum for said beam to fulcrum on a surface not part of said scale, and indicia on the upper side of said beam indicating the corresponding weight pertaining to said transverse grooves.

References Cited by the Examiner

UNITED STATES PATENTS

| 49,059 | 7/1865 | Savy | 177—251 |
|---|---|---|---|
| 1,732,300 | 10/1929 | Buck | 177—251 |
| 2,011,649 | 8/1935 | Phillips | 177—172 |
| 2,890,036 | 6/1959 | Stelzer | 177—171 |

FOREIGN PATENTS

| 16,192 | 8/1889 | Great Britain. |
|---|---|---|

LEO SMILOW, *Primary Examiner.*